(12) United States Patent  
Yamaguchi

(10) Patent No.: US 9,297,943 B2
(45) Date of Patent: Mar. 29, 2016

(54) ABSORPTIVE WIRE-GRID POLARIZER AND OPTICAL APPARATUS

(71) Applicant: CANON KABUSHIKI KAISHA, Tokyo (JP)

(72) Inventor: Yutaka Yamaguchi, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 126 days.

(21) Appl. No.: 14/147,110

(22) Filed: Jan. 3, 2014

(65) Prior Publication Data

US 2014/0192409 A1    Jul. 10, 2014

(30) Foreign Application Priority Data

Jan. 8, 2013  (JP) ................. 2013-000919

(51) Int. Cl.
*G02B 5/30* (2006.01)
*G02B 5/18* (2006.01)

(52) U.S. Cl.
CPC ............ *G02B 5/3058* (2013.01); *G02B 5/1809* (2013.01); *G02B 5/30* (2013.01)

(58) Field of Classification Search
CPC ... G02F 1/1335; G02B 5/3058; G02B 5/3025
USPC ............................. 359/485.01, 485.03, 485.05
See application file for complete search history.

(56) References Cited

U.S. PATENT DOCUMENTS

2008/0278811 A1* 11/2008 Perkins ................ G02B 5/3058
                                                 359/485.05
2010/0302481 A1* 12/2010 Baum et al. ..................... 349/96

FOREIGN PATENT DOCUMENTS

JP      2008-216956 A     9/2008
JP      2009-300655 A    12/2009

* cited by examiner

*Primary Examiner* — Bumsuk Won
*Assistant Examiner* — William R Alexander
(74) *Attorney, Agent, or Firm* — Rossi, Kimms & McDowell LLP

(57) ABSTRACT

The absorptive wire-grid polarizer includes a periodic structure formed on a substrate surface of a dielectric substrate and constituted by a metal and one or more dielectric materials. The periodic structure has a one-dimensional grating structure in which, in a sectional plane orthogonal to a normal to the substrate surface, grating portions of a metal grating formed of the metal and grating portions of dielectric gratings formed of the one or more dielectric materials are one-dimensionally arranged with a grating period P. The Conditions of $n_m \geq 1.0$, $k_m \geq 2.0$, $0.01 \leq FF \leq 0.25$, $N_b \geq 1.40$, and $h \geq 250$ [nm] are satisfied where h represents an entire height of the metal and dielectric gratings, $n_m$ represents a refractive index of a real part of a complex refractive index of the metal, $k_m$ represents an extinction coefficient of an imaginary part of the complex refractive index, and $n_b$ represents an average refractive index of the dielectric grating.

8 Claims, 11 Drawing Sheets

ABSORPTIVE WIRE-GRID POLARIZER AND OPTICAL APPARATUS

BACKGROUND OF THE INVENTION

1. Field of the Invention

The present invention relates to a polarizer, and particularly to an absorptive wire-grid polarizer.

2. Description of the Related Art

A polarizer in which an one-dimensional metal grating is formed on a substrate with a period smaller than that of a visible light wavelength is called "a wire-grid polarizer", which has a function as a polarizer by transmitting a polarized light which vibrates in a direction (polarization direction) parallel to a grating period direction and reflecting a polarized light which vibrates in a polarization direction orthogonal to the grating period direction. Moreover, since a wire-grid polarizer is generally formed of inorganic material, it has greater heat resistance and UV resistance comparing to a film type polarizing plate using absorbed pigments. Due to such characteristics, the wire-grid polarizer has advantages such that deterioration of its polarizing function can be suppressed for a long period of time even being irradiated with a light of high light density when used in liquid crystal projectors, and others.

However, since a wire-grid polarizer strongly reflects a polarized light having a polarization direction whose transmission should be suppressed, it is difficult to use the wire-grid polarizer at places where the reflected light becomes a stray light and affects forming of an image (for example, a projected image in a liquid crystal projector). Japanese Patent Laid-Open Nos. 2008-216956 and 2009-300655 disclose examples of absorptive wire-grid polarizer with suppressed reflection. Japanese Patent Laid-Open No. 2008-216956 discloses an absorptive polarizer provided by forming an absorber grating at an upper part of a grating constituting a wire-grid polarizer. On the other hand, Japanese Patent Laid-Open No. 2009-300655 discloses an absorptive polarizer provided by forming an absorber grating and a protective material on a side surface of a convex portion of a dielectric grating.

However, although the absorptive polarizers disclosed in Japanese Patent Laid-Open Nos. 2008-216956 and 2009-300655 have a sufficiently reduced reflectance comparing to those of conventional wire-grid polarizers, they have a problem that a reflectance of 10% or more remains or that an extinction ratio of a polarized light which is transmitted therethrough is low. The extinction ratio is expressed by a ratio of a transmittance of the transmitted polarized light which vibrates in the direction parallel to the grating period direction and a transmittance of the transmitted polarized light which vibrates in the direction orthogonal to the direction parallel to the grating period direction. The extinction ratio is an index indicating a characteristic of the polarizer.

Japanese Patent Laid-Open No. 2009-300655 discloses an optical element ensuring a sufficient extinction ratio by forming a reflective wire-grid polarizer on a substrate surface opposite to another substrate surface on which an absorptive wire-grid polarizer is formed. Even in such a case, although reflection of a light entering the optical element from its absorptive wire-grid polarizer side surface is suppressed, a reflectance of a light entering the optical element from its reflective wire-grid polarizer side surface (back surface) is not reduced. Furthermore, in order to ensure a sufficient transmittance, it is necessary to precisely match transmission axes of the two polarizers formed on the two substrate surfaces, which causes difficulty of manufacturing thereof.

BRIEF SUMMARY OF THE INVENTION

The present invention provides an absorptive wire-grid polarizer which has a low reflectance for a light entering from either side of a substrate, which has a sufficient extinction ratio and whose manufacturing is easy.

The present invention provides as one aspect thereof an absorptive wire-grid polarizer including a dielectric substrate, and a periodic structure formed on a substrate surface of the dielectric substrate and constituted by a metal and one or more dielectric materials whose number is represented by i. The periodic structure has a one-dimensional grating structure in which, in a sectional plane orthogonal to a normal to the substrate surface, grating portions of a metal grating formed of the metal and grating portions of dielectric gratings formed of the one or more dielectric materials are one-dimensionally arranged with a grating period P smaller than that of an entering light entering the polarizer, and the following conditions are satisfied:

$$n_m \geq 1.0, k_m \geq 2.0$$

$$0.01 \leq FF \leq 0.25$$

$$n_b \geq 1.40$$

$$h \geq 250 \text{ [nm]}$$

where h represents an entire height of the metal and dielectric gratings, $n_m$ represents a refractive index of a real part of a complex refractive index of the metal for a wavelength of the entering light, $k_m$ represents an extinction coefficient of an imaginary part of the complex refractive index, $n_b$ represents an average refractive index of the dielectric grating, and FF represents an average filling factor of the metal grating to the grating period P, FF and $N_b$ being expressed by the following expressions:

$$FF = \frac{1}{h} \int_0^h \frac{W(z)}{P} dz$$

$$n_b = \frac{1}{h} \int_0^h \left( \sum_i \frac{n_i^2 \cdot Wi}{W(z)} \right)^{0.5} dz,$$

$$W(z) = \sum_i W_i(z)$$

where W(z) represents a grating width of the grating portion of the metal grating occupying in the grating period P at a grating height z, and $n_i$ and Wi respectively represent a refractive index and a grating width of an i-th dielectric material.

The present invention provides as another aspect thereof an optical apparatus includes a body of the apparatus, and the above absorptive wire-grid polarizer housed in the body.

Further features of the present invention will become apparent from the following description of exemplary embodiments (with reference to the attached drawings).

DETAILED DESCRIPTION OF THE EMBODIMENTS

Exemplary embodiments of the present invention will be described below with reference to the accompanied drawings.

Figure 1:
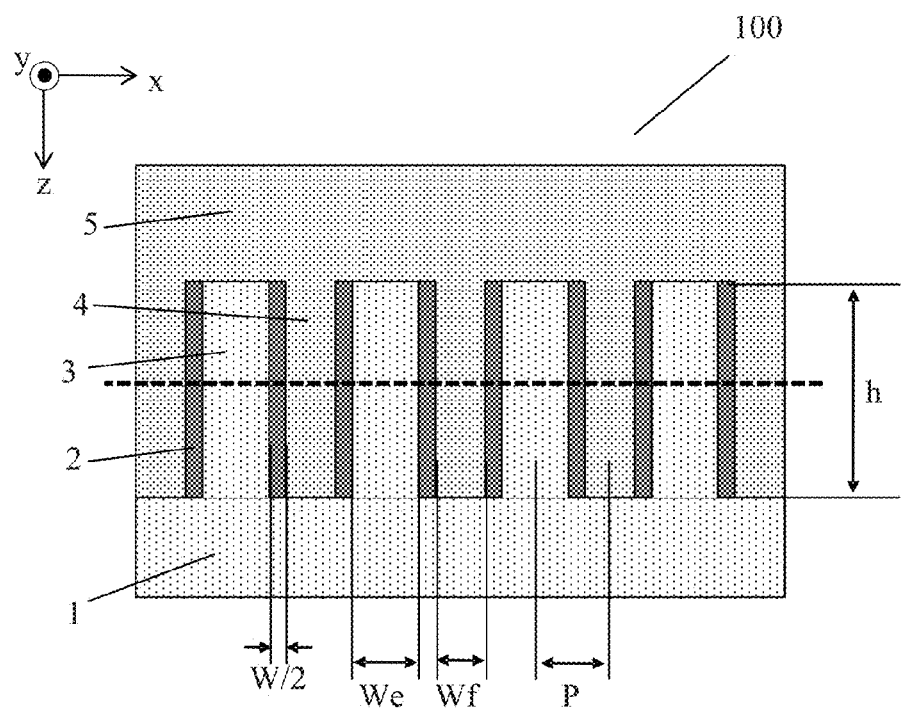
FIG. 1 is a schematic diagram showing a configuration of a polarizing plate that is a typical embodiment of the present invention when seen from a y-direction.

First, description will be made of a configuration of a polarizing plate (polarizer) that is an absorptive wire-grid polarizer as a typical embodiment of the present invention with reference to FIG. 1. FIG. 1 shows a sectional plane of the polarizing plate 100 when seen from its side; the sectional plane is parallel to a normal of a substrate surface described later. The polarizing plate 100 has a structure where a rectangular grating (dielectric grating) 3 formed of a dielectric material is formed on a upper surface (i.e. the above-mentioned substrate surface) of a dielectric substrate 1; the rectangular grating has a minimum repetitive structural period P (hereinafter referred to as a "grating period P") which is smaller than a wavelength of an entering light entering the polarizing plate 100. In this embodiment, the entering light is visible light.

On both side of each grating portion of the dielectric grating 3, metal grating 2 formed of a metal and whose each grating portion has a grating width of W/2 and a grating height (entire height) of h is formed. The grating portion of the dielectric grating 3 is hereinafter referred to as "a dielectric grating portion" and also shown with reference numeral 3 in FIG. 1. The grating portion of the metal grating 2 is hereinafter referred to as "a metal grating portion" and also shown with reference numeral 2 in FIG. 1. Each gap between the metal grating portions 2 is filled with a dielectric material, and thereby a dielectric grating 4 is formed. Each grating portion of the dielectric grating 4 is hereinafter referred to as "a dielectric grating portion" and also shown with reference numeral 4 in FIG. 1. A portion constituted by the metal grating 2 and the dielectric gratings 3 and 4 is collectively referred to as "a one-dimensional grating portion". An upper part of the one-dimensional grating portion is covered with a material 5. The substrate 1, the dielectric gratings 3 and 4 and the material 5 may be different materials from one another.

In a coordinate system shown at an upper right in FIG. 1, a z-direction corresponds to the direction parallel to the normal of the substrate surface, an x-direction corresponds to a direction in which the grating period P is repeated (hereinafter referred to as "a grating period direction"), and a y-direction corresponds to a direction orthogonal to the x and z directions. FIG. 1 shows an x-z sectional plane.

Figure 2:
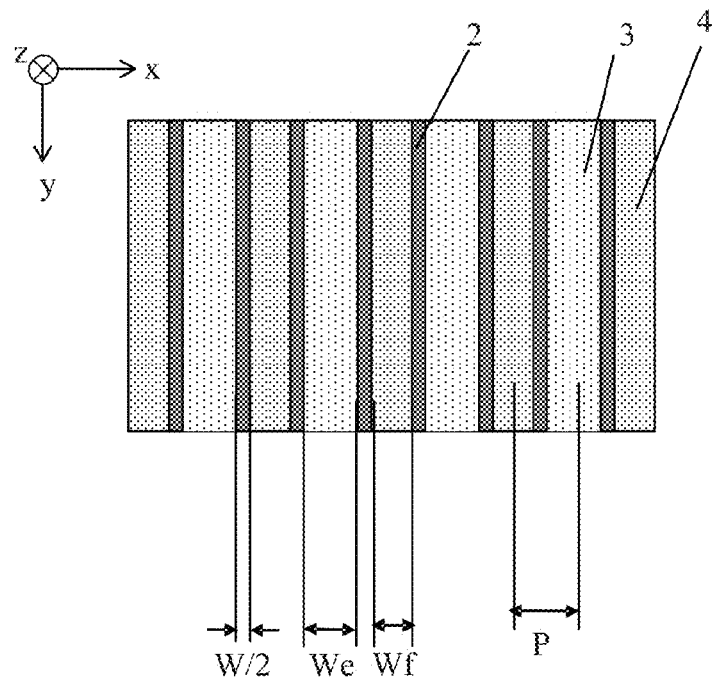
FIG. 2 is a sectional view of the polarizing plate when seen from a z-direction.

FIG. 2 shows a sectional plane (x-y sectional plane) of the polarizing plate 100 when cut at a position indicated with a dotted line in FIG. 1, i.e. at an intermediate position in the grating height direction of the one-dimensional grating portion. As can be understood from FIGS. 1 and 2, the one-dimensional grating portion has a one-dimensional grating structure where (a) the metal grating portions of the metal grating 2 each having an occupied width of W (a grating width of W/2) and each extending in the y-direction and (b) the dielectric grating portions of the dielectric gratings 3 and 4 respectively having grating widths of We and Wf are one-dimensionally arranged repeatedly in the x-direction with the grating period P. The polarizing plate 100 having such a structure transmits a polarized light (hereinafter referred to as "an x-polarized light") which vibrates in a direction parallel to the x-direction (grating period direction) in the light entering the polarizing plate 100 in parallel with the z-direction (hereinafter referred to as "a perpendicularly entering light"). Furthermore, the polarizing plate 100 blocks a polarized light (hereinafter referred to as "a y-polarized light") which vibrates in a direction parallel to the y-direction (direction in which each grating portion extends) which is orthogonal to the x direction.

The polarizing plate 100 satisfies, in order to absorb much of the y-polarized light and not reflect it, conditions expressed by following expressions (1), (2), (3) and (4). That is, when $n_m$ represents a refractive index of the metal grating 2 for a wavelength (visible wavelength) of the entering light, $k_m$ represents an extinction coefficient thereof for the same wavelength, $n_b$ represents an average refractive index of the dielectric materials disposed between the metal grating portions of the metal grating 2 for the same wavelength, and FF represents an average filling factor of the metal grating 2 to the grating period P, the following expressions are satisfied:

$$n_m \geq 1.0, k_m \geq 2.0 \quad (1)$$

$$0.01 \leq FF \leq 0.25 \quad (2)$$

$$n_b \geq 1.40 \quad (3)$$

$$h \geq 250 \text{ [nm]} \quad (4)$$

In expressions (1) to (4), $n_m$ and $k_m$ respectively represent a component of a real part and a component (extinction coefficient) of imaginary part of a complex refractive index of the metal; the complex refractive index is expressed as $n = n_m + ik_m$. Moreover, FF in expression (3) is expressed by following expression (5) when W(z) represents a grating width of the metal (metal grating portion) occupying in the grating period P at a position of a grating height of z in the x-y sectional plane. Furthermore, $n_b$ is expressed by following expression (6) when $n_i$ and Wi respectively represent a refractive index and a grating width of an i-th dielectric material.

$$FF = \frac{1}{h} \int_0^h \frac{W(z)}{p} dz \qquad (5)$$

$$n_b = \frac{1}{h} \int_0^h \left( \sum_1 \frac{ni^2 \cdot Wi}{W(z)} \right)^{0.5} dz, \qquad (6)$$

$$W(z) = \sum_i W_i(z)$$

In expression (5), FF represents an average value of proportions (that is, of filling factors) of the metal grating (metal grating portions) 2 occupying in the grating period P, which is uniform in the z-direction in FIG. 1 and therefore FF=W/P. In expression (6), $n_b$ represents the average refractive index of the dielectric materials (that is, the dielectric gratings 3 and 4) between the metal grating portions. As the dielectric materials disposed between the metal grating portions, one or more dielectric materials whose number is represented by i are used. In the case, as shown in FIG. 1, two dielectric materials are used as rectangular grating portions, the average refractive index $n_b$ is expressed as follows by using a refractive index $n_e$ (grating width $W_e$) of the dielectric material forming the dielectric grating 3 and a refractive index $n_f$ (grating width $W_f$) of the dielectric material forming the dielectric grating 4:

$$n_b = \sqrt{\frac{n_e^2 \cdot W_e}{(W_e + W_f)} + \frac{n_f^2 \cdot W_f}{(W_e + W_f)}}$$

Satisfying the above four conditions enables providing a polarizing plate having a high transmittance and a high extinction ratio for the x-polarized light while absorbing the y-polarized light to suppress reflection of the y-polarized light. A detailed description of this effect will hereinafter be made.

Polarization characteristics of the wire-grid polarizing plate is provided by dielectric constant anisotropy caused by a minute periodic structure having the grating period P smaller than the wavelength (hereinafter also referred to as "a use wavelength") of the light entering the polarizing plate. The polarization characteristics are decided by the refractive index and the extinction coefficient of the metal, the refractive indices of the materials (hereinafter referred to as "inter-grating materials") between the metal grating portions of the metal grating 2, the grating width W and the grating height h of the metal grating portion and others in the one-dimensional grating portion. Assuming that the grating period P is sufficiently smaller than the use wavelength, from a viewpoint of effective material approximation, anisotropy in dielectric constant occurs. That is, a dielectric constant affecting the polarized light (x-polarized light) whose polarization direction is parallel to the grating period direction in the one-dimensional grating portion is close to that of the inter-grating material, and a dielectric constant affecting the polarized light (y-polarized light) whose polarization direction is orthogonal to the grating period direction is close to that of the metal forming the metal grating. Therefore, much of the y-polarized light is reflected or absorbed, and the x-polarized light is transmitted.

Behavior of reflection at an interface between regions having different dielectric constants is expressed by a Fresnel equation. When $n_{in}$ represents a refractive index of an entrance side material and $n_{out}$ represents a refractive index of an exits side material, a reflectance for the perpendicularly entering light is expressed as follows:

$$R = \{(n_{in} - n_{out})/(n_{in} + n_{out})\}^2.$$

In a case where the material has an extinction coefficient like a metal, calculation of R can be made by using a complex refractive index n+ik as n. For example, a reflectance of aluminum (whose refractive index is 1.0 and extinction coefficient k is 6.8) itself at an interface with air is about 92% and a reflectance of silver (whose refractive index is 0.125 and extinction coefficient is 3.3) at an interface with air is 96% or more; aluminum and silver are often used for the wire-grid polarizing plate. Thus, though depending on the width of the metal grating portion of the metal grating 2, much of the y-polarized light entering the wire-grid polarizing plate is formed with aluminum or silver is reflected.

One of reasons why the reflectance is high is because the extinction coefficient of the metal itself is high. Therefore, it is considered that the reflectance is reduced by reducing the extinction coefficient. However, a small extinction coefficient $k_m$ of the metal itself forming the metal grating reduces a ratio $k_y/k_x$ of the extinction coefficients $k_x$ and $k_y$ for the x- and y-polarized lights in the one-dimensional grating portion, which makes it difficult to ensure an extinction ratio necessary for a polarizing plate.

Figure 3:
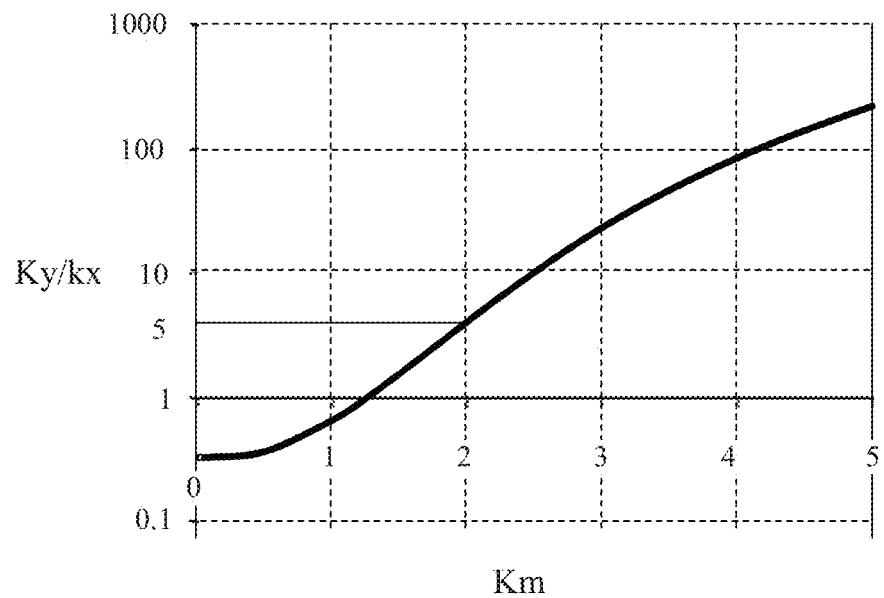
FIG. 3 shows a correlation between an extinction coefficient Km of a metal and a ratio of extinction coefficients $k_x$ and $k_y$ at a grating portion.

FIG. 3 shows a correlation between the ratio ky/kx of the extinction coefficients for the x- and y-polarized lights in the one-dimensional grating portion and the extinction coefficient $k_m$ of the metal grating. As can be understood from FIG. 3, as the extinction coefficient $k_m$ increases, the ratio ky/kx increases. In this example, the calculation is made by setting the average filling factor FF to 0.25, and however the increase of the ratio ky/kx with the increase of the extinction coefficient $k_m$ does not depend on the average filling factor FF. A small ratio ky/kx increases the grating height needed for ensuring the extinction ratio of the polarizing plate, which makes manufacturing of the gratings more difficult. In order to provide a realistic height to the gratings in consideration of the manufacturing, it is desirable that the ratio ky/kx be 5 or greater. In order to achieve this, as shown in the condition of expression (1), it is desirable to select a metal to be used for the metal grating which has an extinction coefficient $k_m$ of 2.0 or greater. It is more desirable to select a metal having an extinction coefficient $k_m$ of 3.0 or greater.

Figure 4:
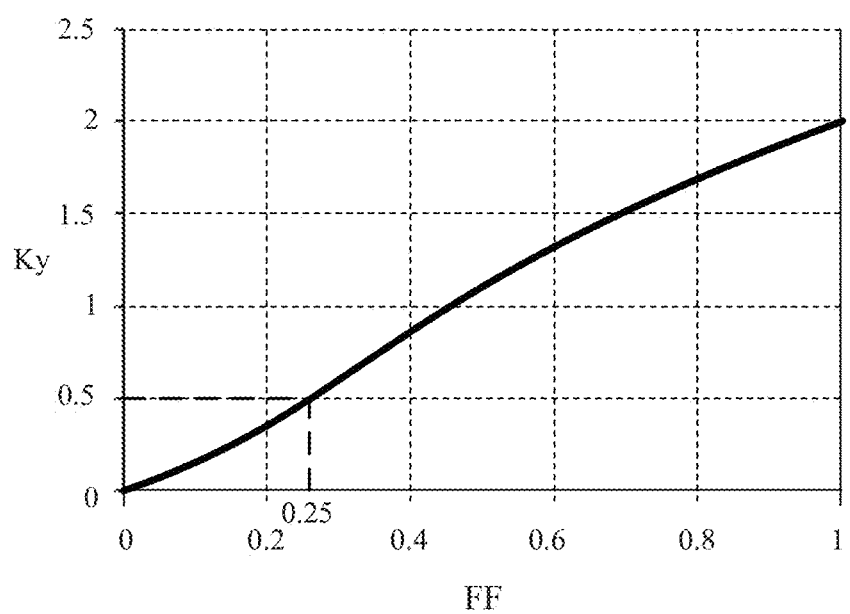
FIG. 4 shows a correlation between a filling factor FF of a grating width of the metal and the extinction coefficient $k_y$ for a polarized light whose polarization direction is orthogonal to a grating period direction.

In order to reduce the extinction coefficient for the y-polarized light while maintaining the extinction coefficient of the metal used for the metal grating high, it is necessary that the average filling factor FF which is the proportion of the grating width in the grating period P be as small as possible. FIG. 4 shows the correlation between the average filling factors FF shown along a horizontal axis and effective extinction coefficients ky for the y-polarized light shown along a vertical axis. Calculation conditions applied here are $k_m=2$, $n_m=1$ and $n_b=1.48$.

As can be understood from FIG. 4, as the average filling factor FF decreases, the extinction coefficient ky uniformly decreases. In order to suppress the reflectance, it is desirable that the extinction coefficient ky be 0.5 or smaller. In order to achieve this, it is desirable that the average filling factor FF of the metal grating calculated by expression (5) be 0.25 or smaller as shown in the condition of expression (2), and it is more desirable that the average filling factor FF be 0.15 or smaller. The reason why the average value of the filling factor FF is employed over the entire region of the grating height in expression (5) is because, even when a local partial region of the one-dimensional grating portion has a structure not satisfying this condition, its influence can be suppressed to be small if that local partial region is minute with respect to the entire region. However, ideally, it is desirable that the entire region of the grating height has a structure satisfying the condition shown by expression (3). As described above, setting the average filling factor FF to be very small while maintaining the extinction coefficient of the metal itself high enables achieving a wire-grid polarizing plate realizing both a sufficient extinction ratio and a low reflectance with a realistic grating height.

Furthermore, not only the extinction coefficient $k_m$, but also a level of the refractive index $n_m$ is important for realizing a low reflectance. When the refractive index of the metal approximates 0, the value of Fresnel equation converges to 1. Therefore, even when the refractive index of the metal is extremely small, the reflectance increases. Therefore, in order to further reduce the reflection in the wire-grid polarizing plate, it is desirable to use a metal material having not only a large extinction coefficient $k_m$ but also a high refractive index $n_m$. Specifically, as shown in the condition of expression (1), it is desirable that a metal material forming the metal grating has a refractive index $n_m$ of 1.0 or higher be used, and it is more desirable to select a metal material forming the metal grating has a refractive index $n_m$ of 2.0 or higher. As a metal material having such a refractive index, any of Cr, V, W, Mo, Ta, Fe, Te, Co, Ni, Ge and Ti, excluding Au, Ag and Al which increase the reflectance, or an alloy or a compound including any of the above Cr to Ti. However, the metal material is not limited thereto, and any metal material can be used as long as the metal material satisfies the condition of expression (1).

Moreover, the refractive indices of the one-dimensional grating portion for the x- and y-polarized lights are affected by the dielectric material 3 or 4 filled between the metal grating portions of the metal grating 2. Appropriately selecting the refractive index of the dielectric material filled between the metal grating portions 2 enables suppressing reflection at an interface between the one-dimensional grating portion and the substrate 1 or at an interface of the upper part of the one-dimensional grating portion. Specifically, it is desirable that the average refractive index $n_b$ of the dielectric material filled between the metal grating portions of the metal grating 2 shown by expression (6) be 1.4 or higher as shown in the condition of expression (3). The reason why expression (6) is expressed by using the average value over the entire region of the grating height is for the same reason as the average filling factor FF in expression (5). Ideally, it is also desirable that the average refractive index $n_b$ satisfy the condition of expression (3) over the entire region of the grating height.

Employing the above-described structure enables minimizing the reflection of the y-polarized light in the wire-grid polarizing plate. However, since the average filling factor FF is very small in such a structure, a low grating height h cannot provide a sufficient extinction ratio. Although even a grating height of about 100 nm provides a high extinction ratio in a normal wire-grid, that grating height cannot provide a sufficient extinction ratio in the wire-grid polarizing plate of this embodiment. The polarizing plate of this embodiment desirably has, though depending on extinction performance required for the polarizing plate, at least a grating height h of 250 nm or higher as shown in the condition of expression (4). However, even when a structure has a grating height lower than 250 nm and thereby cannot provide a sufficient extinction ratio, multiple lamination thereof can provide a high extinction ratio. In such a case, when regarding h as being a total sum of the grating heights of the polarizing plate, it is desirable that h be 250 nm or higher.

Figure 5A:
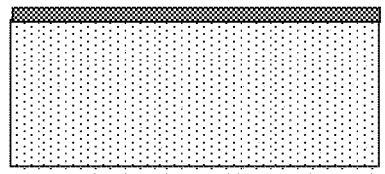
FIGS. 5A to 5F show an example of a manufacturing process of the above polarizing plate.
Figure 5B:
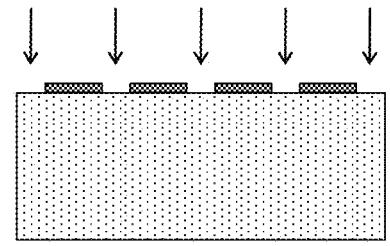
Figure 5C:
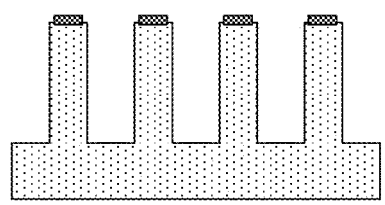

The minute periodic structure of the polarizing plate of this embodiment can be manufactured by various methods. For example, the minute periodic structure can be manufactured by a process shown in FIGS. 5A to 5F. First, the process forms a dielectric grating structure on a substrate. Specifically, as shown in FIGS. 5A to 5C, the process can form a grid-like mask by electron beam (EB) lithography or photolithography and then performs etching with the mask to form the dielectric grating structure. Alternatively, the process can form the dielectric grating structure by nano-imprinting (lithography) that transfers the structure by using a mold in which inverted minute dielectric grating is formed.

Figure 5D:
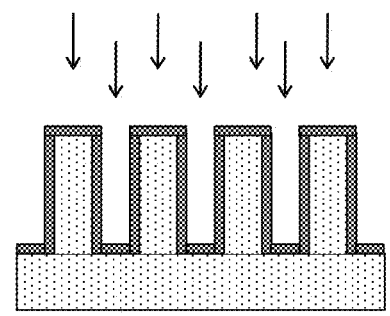

Thereafter, as shown in FIG. 5D, the process attaches a metal material thinly around the dielectric grating portions by deposition of a metal film or metal plating on the dielectric grating portions. If needed, the process may remove the metal film from an upper and lower part of the dielectric grating portions by etching.

Figure 5E:
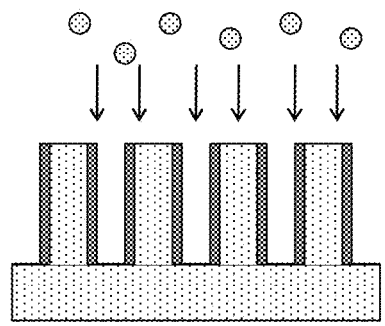
Figure 5F:
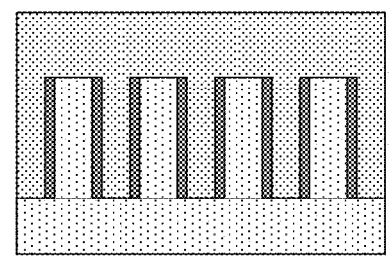

Next, as shown in FIG. 5E, the process fills gaps between the metal films (metal grating portions) and covers the upper part of the metal and dielectric grating portions with a dielectric material by spattering or vapor-deposition to form the structure shown in FIG. 1. This manufacturing method is an example, and the manufacturing method of the polarizing plate of this embodiment is not limited thereto.

As described above, in order to realize a low reflectance for the y-polarized light which is a feature of the polarizing plate of this embodiment, it is necessary to satisfy the conditions shown by expressions (1) to (4). However, the grating portions is not limited to those having the shape shown in FIG. 1, and may be formed in other various shapes. For example, the grating portions may be formed in a shape shown in FIG. 6.

Figure 6:
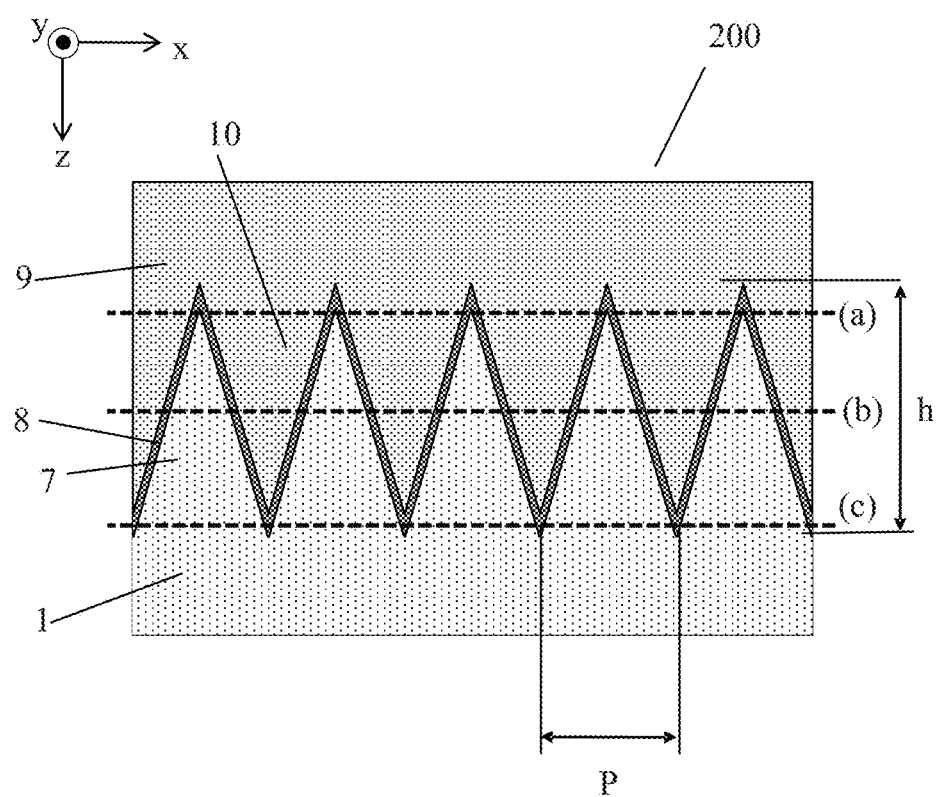
FIG. 6 is a schematic diagram showing another configuration of the above polarizing plate when seen from the y-direction.
Figure 7A:
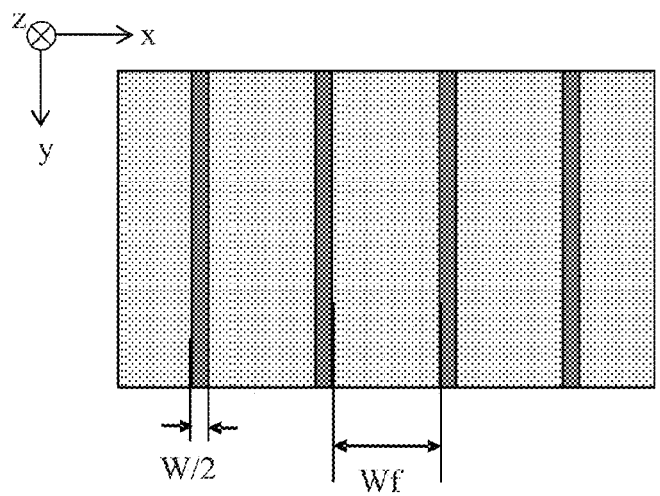
FIGS. 7A to 7C are sectional views of the above polarizing plate at different grating heights when seen from the z-direction.
Figure 7B:
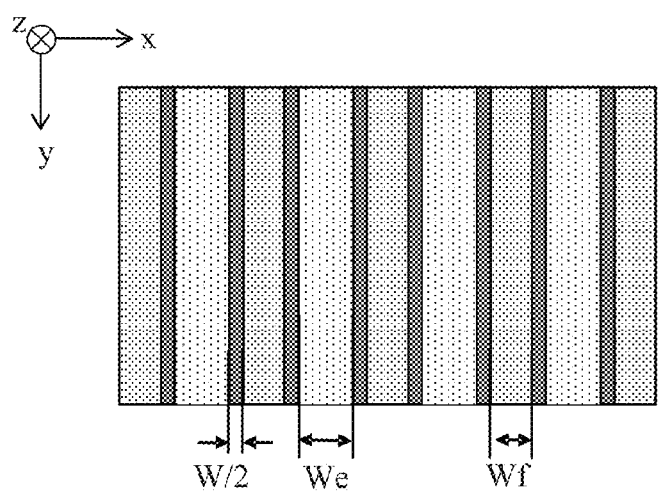
Figure 7C:
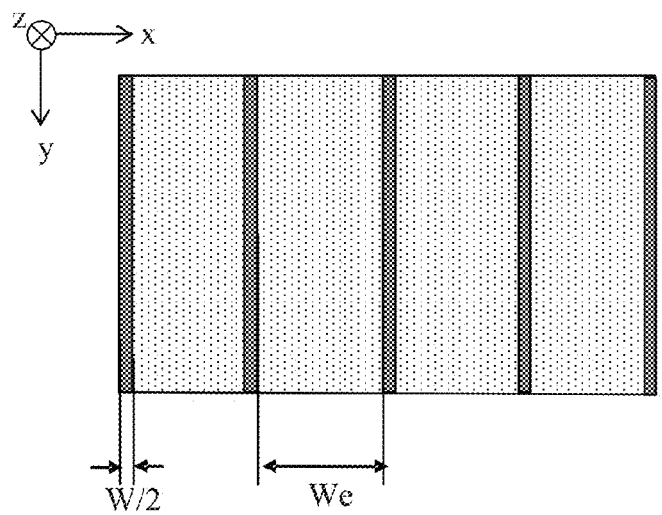

FIG. 6 shows a polarizing plate 200 having a structure in which a triangular grating 7 whose each grating portion is a triangular dielectric grating portion is formed on a substrate 1 (substrate surface) and in which oblique surfaces of each triangular grating portion 7 are wholly covered with a metal layer 8. Moreover, an upper part than the metal layer 8 is covered by a dielectric material 9 to form a triangular grating 10 whose each grating portion is a triangular dielectric grating portion, and thereby a triangular one-dimensional grating portion constituted by the triangular gratings (dielectric gratings) 7 and 10 and the metal layer (metal grating) 8 and having a grating height h serves as a wire-grid polarizing plate. FIGS. 7A to 7C show x-y sectional planes of an upper part (a), a middle part (b) and a lower part (c) of the triangular one-dimensional grating portion shown in FIG. 6. As can be understood from FIGS. 7A to 7C, a one-dimensional grating structure is formed in the x-y sectional plane at each height region of the triangular one-dimensional grating portion shown in FIG. 6.

In a case where the triangular one-dimensional grating portion is configured as a minute periodic structure having a period shorter than the use wavelength, even when the entire surface (oblique surfaces) of the triangular grating 7 is covered with the metal layer 8 as shown in FIG. 6, the triangular one-dimensional grating portion serves as the wire-grid polarizer. Such a structure can be formed by nano-imprinting of the triangular grating 7 and then thinly layering the metal layer 8 on the oblique surfaces thereof, so that manufacturing is easy even when the polarizing plate has a small average filling factor FF.

In this structure, an average refractive index of the dielectric materials as inter-grating materials varies depending on the refractive indices of the triangular gratings 7 and 10 and the grating height. However, in such case, it is sufficient that the average refractive index of the dielectric materials obtained by averaging over the entire grating height satisfies the above-described range. Therefore, the average refractive index $n_b$ in expression (6) is an average value of the average refractive indices $n_b$ in the grating height h. In a case where the grating portions have triangular grating shapes whose proportions change uniformly in the grating height h as shown in FIG. 6, it is sufficient to calculate the average refractive index $n_b$ at a height of h/2 which is half of the grating height h.

Figure 8:
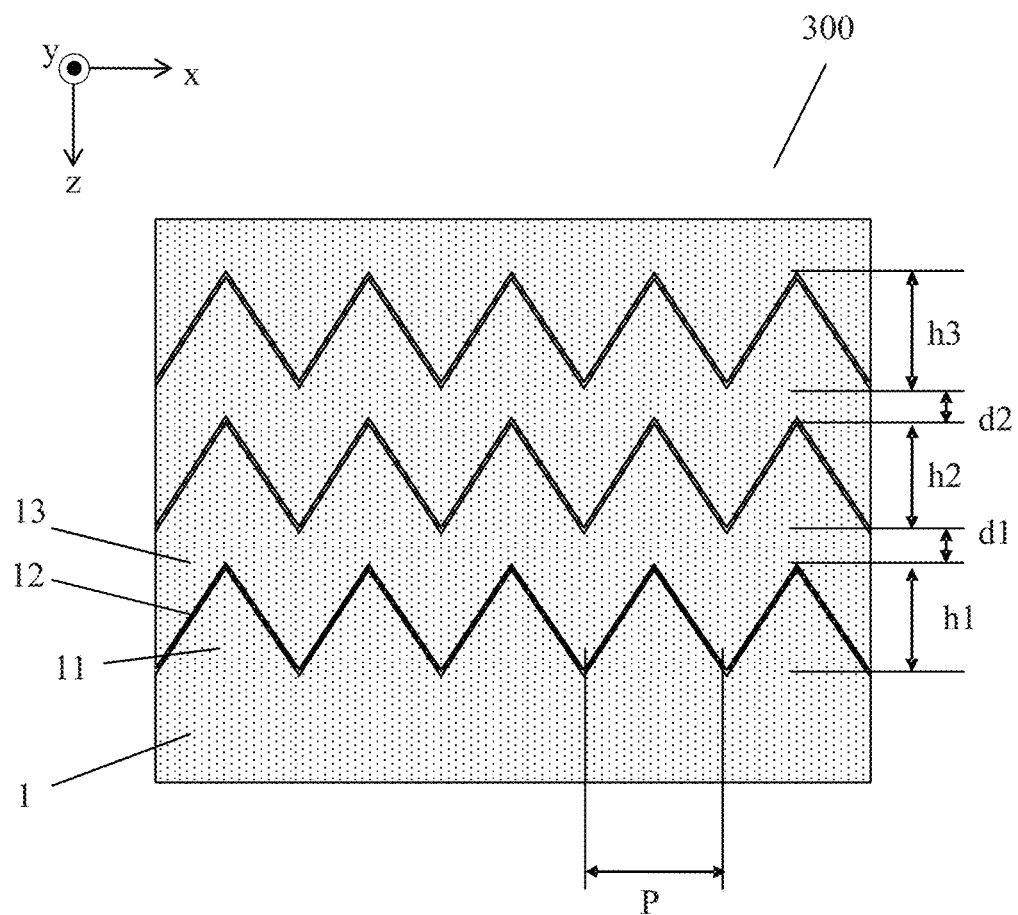
FIG. 8 is a schematic diagram showing still another configuration of the above polarizing plate when seen from the y-direction.

Alternatively, a structure may be employed in which metal gratings are laminated as shown in FIG. 8. A polarizing plate 300 shown in FIG. 8 has a structure in which a triangular grating (dielectric material) 11 is formed on a substrate 1 (substrate surface), a metal layer 12 is layered on the entire oblique surfaces of the triangular grating 11 and an upper part than the metal layer 12 is covered by a dielectric material 13 and in which multiple (three in FIG. 8) triangular one-dimensional grating portions (referred to as "triangular grating layers") each constituted by the triangular gratings 11 and 13 and the metal layer 12 are laminated in a normal direction of the substrate surface (z-direction). When grating heights of the three triangular grating layers (lower, middle and upper triangular grating layers) have h1, h2 and h3, it is desirable that their total sum h=h1+h2+h3 be 250 nm or higher, as described above. However, the respective grating heights h1, h2 and h3 may be arbitrarily set and the number of the triangular grating layers may be more than three.

In between the lower and middle triangular grating layers and in between the middle and upper triangular grating layers, dielectric layers (intermediate layers) having heights d1 and d2 are formed, respectively. Adjustment of these heights d1 and d2 can control interference occurring between the metal gratings 12 and to suppress reflection at an arbitrary wavelength. It is desirable that, though depending on a design wavelength, a product of a refractive index and a thickness of the intermediate layer be 20 nm or more and 300 nm or less. An excessively large value of the heights d1 and d2 causes many ripples due to the interference and thereby a use wavelength range is likely to be limited, which is not desirable. Such a problem can be resolved by making the heights d1 and d2 higher than a range where the interference occurs. However, it is necessary to precisely match the grating period directions of the one-dimensional grating structures of the laminated triangular grating layers, and therefore it is not desirable to make the intermediate layers excessively thick also in view of manufacturing difficulty. When calculation of expressions (5) and (6) is made for the structure shown in FIG. 8, it is sufficient that the integration is made only in the one-dimensional grating portions, that is, it is not necessary that the integration is made in the dielectric layers.

Although description was made of some examples of the grating shapes and the structures, polarizing plates as alternative embodiments of the present invention can be realized by other various grating shapes and structures than those shown in FIGS. 1, 6 and 8. For example, the above-described structures may be formed on both surfaces of the substrate. In this case, a high grating height can be obtained as well as that of the laminated structure, which can facilitate a sufficient extinction ratio. Furthermore, combinations of the above-described structures may be employed, and optimum structures may be selected according to a purpose and a required characteristic.

This embodiment can realize an absorptive wire-grid polarizer whose manufacturing is easy because of its simple structure, which achieves low reflective for the light entering from either side of the substrate and which has a sufficient extinction ratio.

Description of specific embodiments (numerical examples) of the present invention will hereinafter be made.

Embodiment 1

A polarizing plate of a first embodiment (Embodiment 1) has the same basic structure as that shown in FIG. 1. Parameters of the polarizing plate of this embodiment such as the grating height h, the average filling factor FF and others are correctively shown in Table 1. A transmittance Tx for the x-polarized light, a reflectance Ry for the y-polarized light and an extinction ratio Tx/Ty of the polarizing plate of this embodiment at a wavelength of 550 nm are shown in Table 2.

In the polarizing plate of this embodiment, a single layer of a rectangular metal grating having a grating period of 50 nm, a grating width of 3 nm and a grating height (entire height) of 1000 nm is formed on the substrate surface. The metal grating has a refractive index $n_m$ of 2.0, an extinction coefficient $k_m$ of 3.0 and an average filling factor FF of 0.06. Moreover, the substrate has a refractive index $n_{base}$ of 1.48, the dielectric gratings formed between the metal grating portions of the metal grating have an average refractive index $n_b$ of 1.48, and the dielectric material covering the upper part of the one-dimensional grating portion has a refractive index $n_{top}$ of 1.48. The polarizing plate of this embodiment satisfies all the conditions of expressions (1) to (4), which enables achievement a high transmittance Tx and a low reflectance Ry.

Comparison examples 1 to 4 which have structures not satisfying at least one of the four conditions shown by expressions (1) to (4) are shown in Table 3. A transmittance Tx for the x-polarized light, a reflectance Ry for the y-polarized light and an extinction ratio Tx/Ty of each of the comparison examples 1, 2a, 2b, 3a, 3b and 4 are shown in Table 4. Furthermore, relative merits of performance of the polarizing plate of each of Embodiment 1 and Comparative Examples 1 to 4 are shown in Table 5 by "○" (good), "Δ" (slightly bad) and "x" (bad). From Tables 3 to 5, it can be understood that not satisfying at least one of the four conditions makes it difficult to achieve a sufficiently low reflectance Ry for the y-polarized light and a sufficiently high extinction ratio. Only the structure of Embodiment 1 achieves such a sufficiently low reflectance Ry for the y-polarized light and a sufficiently high extinction ratio, which shows that it is necessary for achievement of a low reflectance and a high extinction ratio to satisfy all the conditions shown by expressions (1) to (4).

Figure 9A:
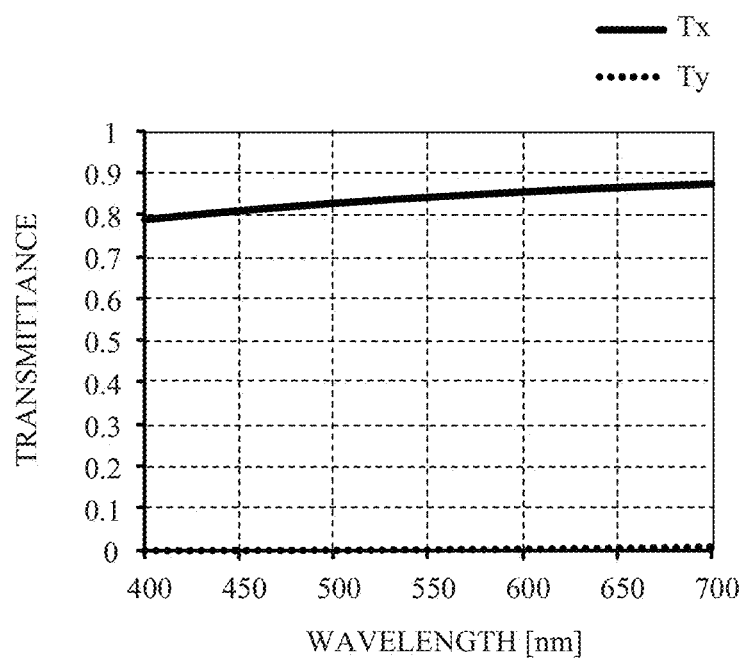
FIGS. 9A and 9B respectively show spectral transmittance and spectral reflectance of a polarizing plate of Embodiment 1.
Figure 9B:
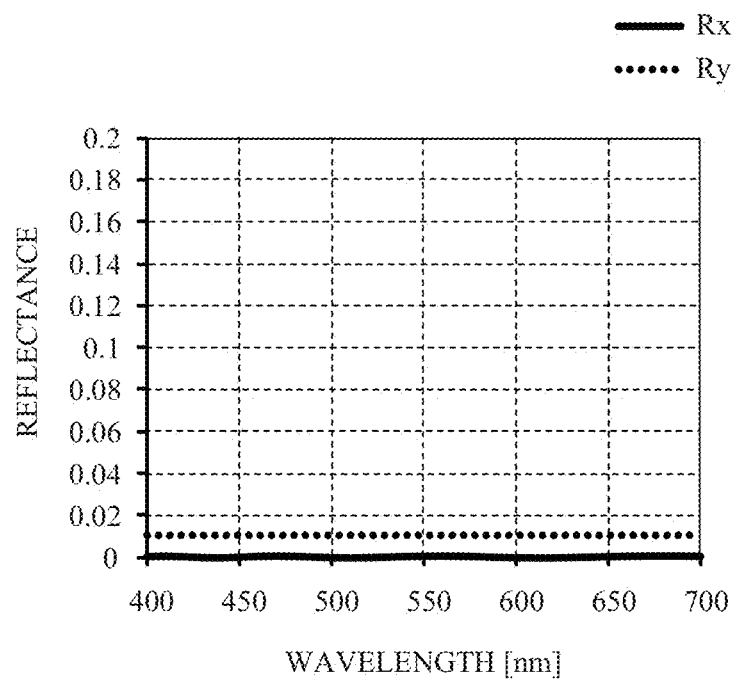

FIGS. 9A and 9B respectively show spectral transmittance and spectral reflectance of the polarizing plate of Embodiment 1 in a wavelength range from 400 nm to 700 nm. As can be understood from these figures, the polarizing plate of Embodiment 1 suppresses the reflectance for the y-polarized light to approximately 1% while ensuring a transmittance of 80% or greater for the x-polarized light in the entire visible light wavelength.

Embodiment 2

A polarizing plate of a second embodiment (Embodiment 2) has the same basic structure as that shown in FIG. 1. The polarizing plate of this embodiment uses Mo as the material of the metal grating. Parameters of the polarizing plate of this embodiment are correctively shown in Table 1.

In the polarizing plate of this embodiment, a single layer of a rectangular metal grating having a grating period of 100 nm, a grating width of 10 nm and a grating height (entire height) of 300 nm is formed on the substrate surface. The metal grating has a refractive index $n_m$ of 3.78, an extinction coefficient $k_m$ of 3.52 and an average filling factor FF of 0.1.

Moreover, the substrate has a refractive index $n_{base}$ of 2.0, the dielectric gratings formed between the metal grating portions of the metal grating have an average refractive index $n_b$ of 2.155, and the dielectric material covering the upper part of the one-dimensional grating portion has a refractive index $n_{top}$ of 2.30. The polarizing plate of this embodiment satisfies all the conditions of expressions (1) to (4). The polarizing plate of this embodiment uses as the substrate a higher refractive index substrate than that in Embodiment 1 and a higher refractive index dielectric material covering the one-dimensional grating portion.

A transmittance Tx for the x-polarized light, a reflectance Ry for the y-polarized light and an extinction ratio Tx/Ty of the polarizing plate of this embodiment at a wavelength of 550 nm are shown in Table 2. As can be understood from Table 2, the polarizing plate of this embodiment achieves a high transmittance Tx and a low reflectance Ry. The polarizing plate of this embodiment serves as a low reflective polarizer having a sufficiently high extinction ratio though having a lower grating height than that in Embodiment 1.

Embodiment 3

A polarizing plate of a third embodiment (Embodiment 3) has the same basic structure as that shown in FIG. 1. The polarizing plate of this embodiment uses Ti as the material of the metal grating. Parameters of the polarizing plate of this embodiment are correctively shown in Table 1.

In the polarizing plate of this embodiment, a single layer of a rectangular metal grating having a grating period of 100 nm, a grating width of 15 nm and a grating height (entire height) of 400 nm is formed on the substrate surface. The metal grating has a refractive index $n_m$ of 1.88, an extinction coefficient $k_m$ of 2.61 and an average filling factor FF of 0.15. Moreover, the substrate has a refractive index $n_{base}$ of 1.48, the dielectric gratings formed between the metal grating portions of the metal grating have an average refractive index $n_b$ of 1.48, and the dielectric material covering the upper part of the one-dimensional grating portion has a refractive index $n_{top}$ of 1.48. The polarizing plate of this embodiment satisfies all the conditions of expressions (1) to (4), thereby achieving a high transmittance Tx and a low reflectance Ry.

A transmittance Tx for the x-polarized light, a reflectance Ry for the y-polarized light and an extinction ratio Tx/Ty of the polarizing plate of this embodiment at a wavelength of 550 nm are shown in Table 2. As can be understood from Table 2, the polarizing plate of this embodiment achieves a high transmittance Tx and a low reflectance Ry. The polarizing plate of this embodiment serves as a low reflective polarizer having a high extinction ratio though having a lower grating height than that in Embodiment 1.

Embodiment 4

A polarizing plate of a fourth embodiment (Embodiment 4) has the same basic structure as that shown in FIG. 6. The polarizing plate of this embodiment uses W (tungsten) as the material of the metal grating. Parameters of the polarizing plate of this embodiment are correctively shown in Table 1.

In the polarizing plate of this embodiment, a single layer of a triangular grating having a grating period of 100 nm and a grating height (entire height) of 1000 nm is formed on the substrate surface, a tungsten layer (metal grating) is formed thereon with a width (thickness) of 35 nm, and the tungsten layer is covered with $SiO_2$ whose refractive index is 1.48. The metal grating has an average filling factor FF of 0.04, which satisfies the condition shown by expression (2). Moreover, the metal grating has a refractive index $n_m$ of 2.73 and an extinction coefficient $k_m$ of 3.51. Furthermore, the substrate has a refractive index $n_{base}$ of 1.48, the dielectric gratings formed between the metal grating portions of the metal grating have an average refractive index $n_b$ of 1.48, and the dielectric material covering the upper part of the one-dimensional grating portion has a refractive index $n_{top}$ of 1.48. The polarizing plate of this embodiment also satisfies the conditions of expressions (1), (3) and (4).

A transmittance Tx for the x-polarized light, a reflectance Ry for the y-polarized light and an extinction ratio Tx/Ty of the polarizing plate of this embodiment at a wavelength of 550 nm are shown in Table 2. As can be understood from Table 2, the polarizing plate of this embodiment achieves a high transmittance Tx and a low reflectance Ry.

Figure 10A:
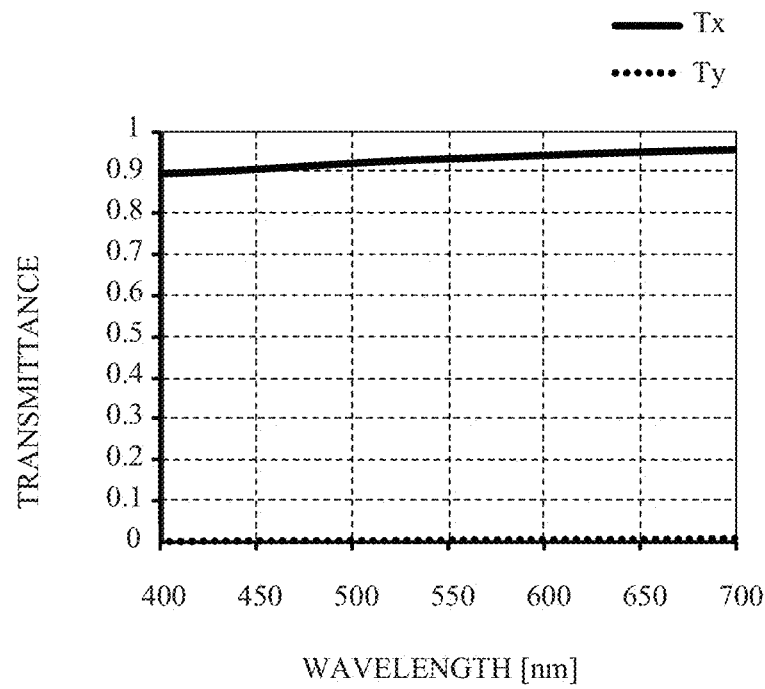
FIGS. 10A and 10B respectively show spectral transmittance and spectral reflectance of a polarizing plate of Embodiment 4.
Figure 10B:
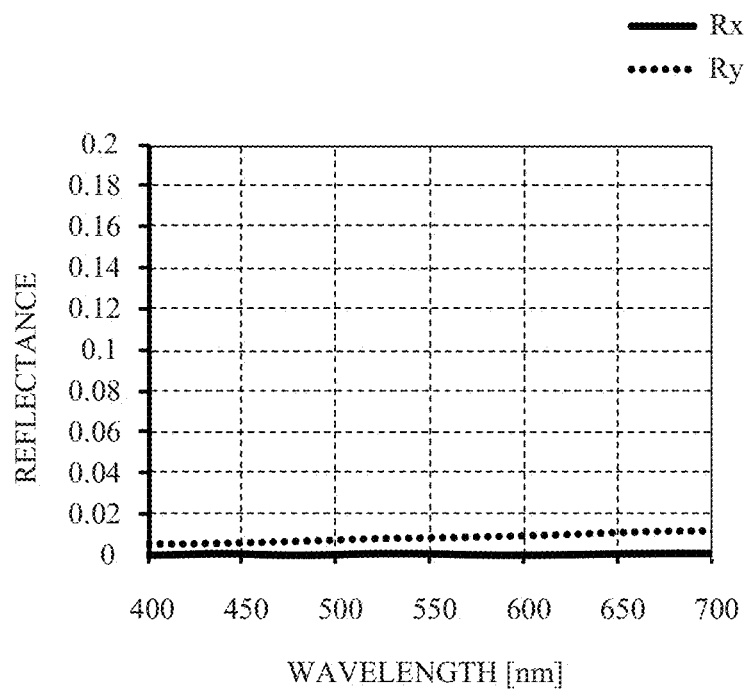

FIGS. 10A and 10B respectively show spectral transmittance and spectral reflectance of the polarizing plate of this embodiment in a wavelength range from 400 nm to 700 nm. As can be understood from these figures, the polarizing plate of this embodiment suppresses the reflectance for the y-polarized light to approximately 1% while ensuring a transmittance of 90% or greater for the x-polarized light in the entire visible light wavelength.

Embodiment 5

A polarizing plate of a fifth embodiment (Embodiment 5) has the same basic structure as that shown in FIG. 8. The polarizing plate of this embodiment uses Cr as the material of the metal grating. Parameters of the polarizing plate of this embodiment are correctively shown in Table 1.

In the polarizing plate of this embodiment, six layers are laminated on the substrate surface; each layer is configured such that a triangular grating having a grating period of 100 nm and a grating height (entire height) of 180 nm are formed, a Cr film (metal grating) is formed thereon with a width (thickness) of 5 nm, and the Cr film is covered with $SiO_2$ whose refractive index is 1.48. The $SiO_2$ film between the metal gratings has a thickness of 150 nm. The metal grating has an average filling factor FF of 0.054, which satisfies the condition shown by expression (2). Moreover, the metal grating has a refractive index $n_m$ of 4.12 and an extinction coefficient $k_m$ of 5.42. Furthermore, the substrate has a refractive index $n_{base}$ of 1.48, the dielectric gratings formed between the metal grating portions of the metal grating have an average refractive index $n_b$ of 1.48, and the dielectric material covering the upper part of the one-dimensional grating portion has a refractive index $n_{top}$ of 1.48. The total sum h of the grating heights (thickness) of the six one-dimensional grating portions is 1080 nm. The polarizing plate of this embodiment also satisfies the conditions of expressions (1), (3) and (4). The calculation of the expressions (5) and (6) was made only in the six one-dimensional grating portions, that is, the calculation of the expressions (5) and (6) was not made in the intermediate dielectric layers.

A transmittance Tx for the x-polarized light, a reflectance Ry for the y-polarized light and an extinction ratio Tx/Ty of the polarizing plate of this embodiment at a wavelength of 550 nm are shown in Table 2. As can be understood from Table 2, the polarizing plate of this embodiment achieves a high transmittance Tx and a low reflectance Ry.

Figure 11A:
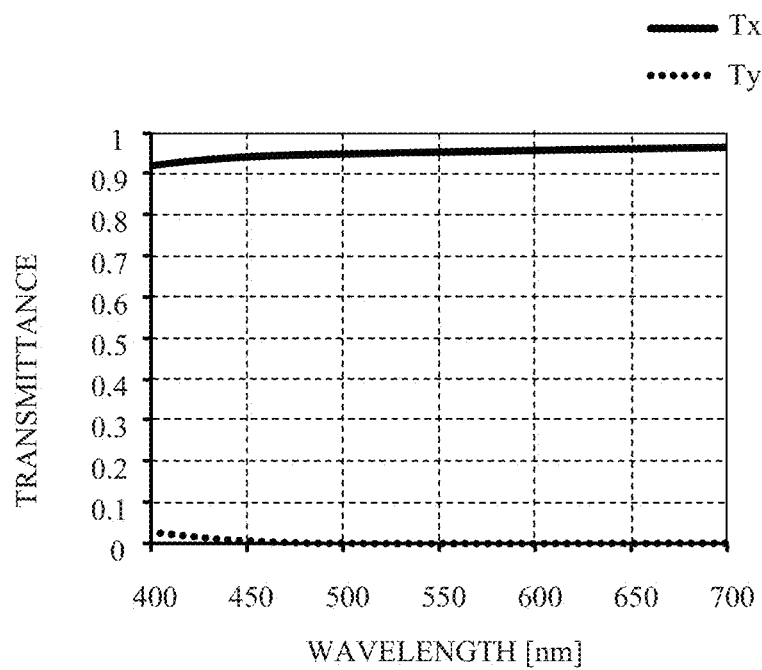
FIGS. 11A and 11B respectively show spectral transmittance and spectral reflectance of a polarizing plate of Embodiment 5.
Figure 11B:
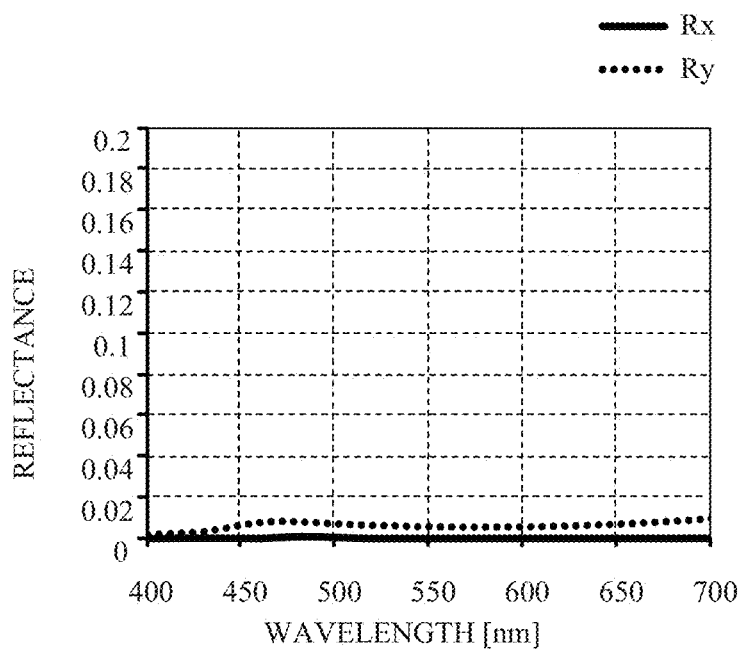

FIGS. 11A and 11B respectively show spectral transmittance and spectral reflectance of the polarizing plate of this embodiment in a wavelength range from 400 nm to 700 nm. As can be understood from these figures, the polarizing plate of this embodiment suppresses the reflectance for the y-polarized light to approximately 1% while ensuring a transmittance of 90% or greater for the x-polarized light in the entire visible light wavelength.

Embodiment 6

Figure 12:
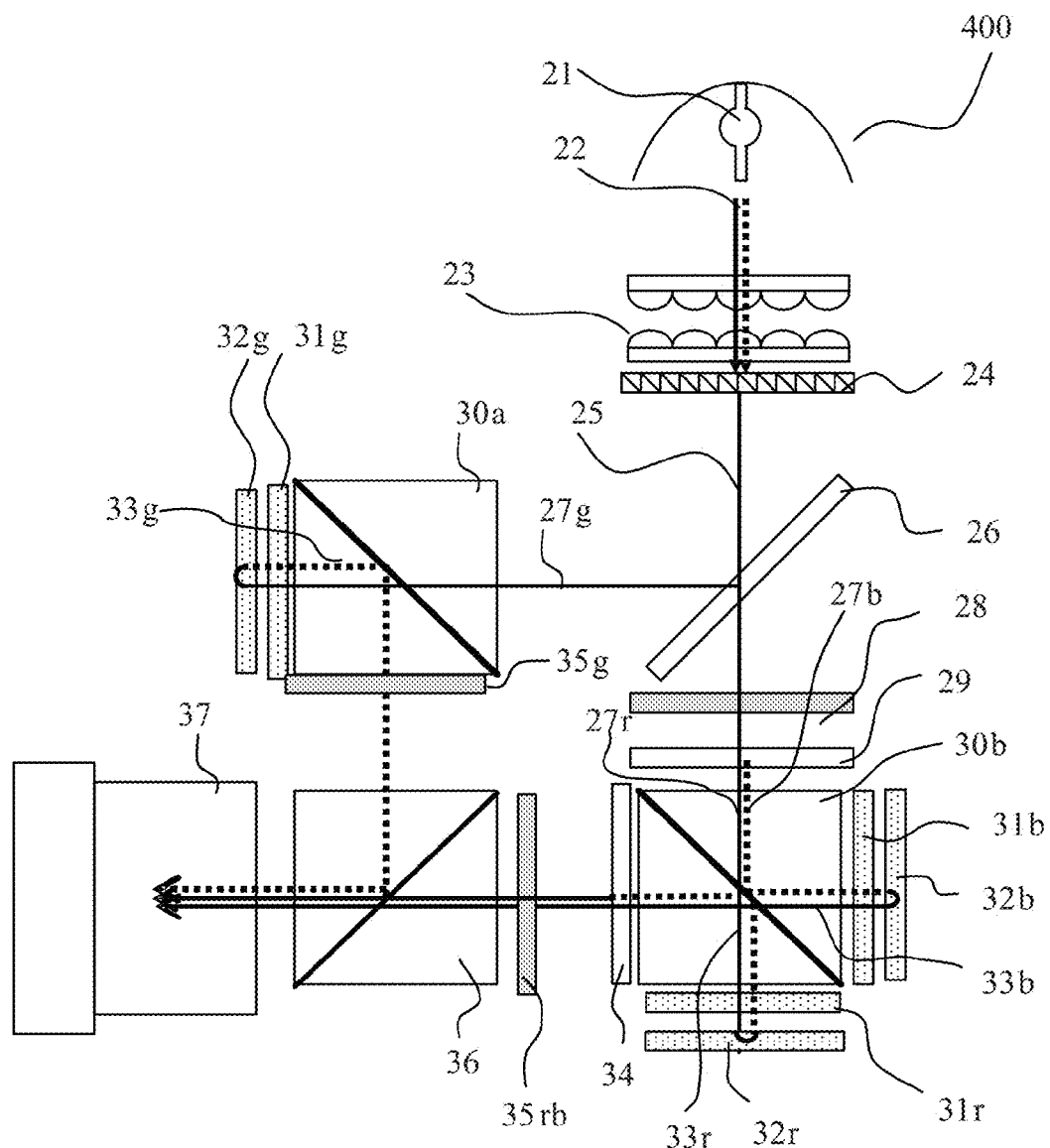
FIG. 12 is a schematic diagram showing a configuration of an image projection apparatus that is Embodiment 6 of the present invention.

Next, description will be made of an image projection apparatus as an optical apparatus using any of the polarizing plates described in the above embodiments; the image projection apparatus is a sixth embodiment (Embodiment 6) of the present invention. FIG. 12 shows a configuration of the image projection apparatus 400.

An illumination light flux 22 emitted from the light source 21 passes through an illumination optical system 23 and a polarization conversion element 24 to be converted into a linearly polarized light having a predetermined polarization direction. Thereafter, the illumination light flux 22 is separated into a green illumination light 27g, a blue illumination light 27b and a red illumination light 27r by a dichroic mirror 26. The green illumination light 27g is transmitted through a polarization beam splitter 30a and a phase plate 31g to reach a green image display element 32g such as a liquid crystal panel or a digital micro-mirror device and is reflected thereby as a green image light. The blue illumination light 27b and the red illumination light 27r are transmitted through a polarizing plate 28 and transmitted through a color selective phase plate 29; the blue illumination light 27b whose polarization direction is rotated by 90 degrees by the color selective phase plate 29 and the red illumination light 27r enter a polarization beam splitter 30b. In the polarization beam splitter 30b, the blue illumination light 27b is reflected thereby and the red illumination light 27r is transmitted therethrough. Thereafter, the blue illumination light 27b and the red illumination light 27r are transmitted through phase plates 31b and 31r and are then reflected by blue and red image display elements 32b and 32r as blue and red image lights, respectively. The green image light 33g is reflected by the polarization beam splitter 30a, is transmitted through a polarizing plate 35g and then enters a combining prism 36.

The blue and red image lights 33b and 33r are combined by the polarization beam splitter 30b, are transmitted through the color selective phase plate 34 again to be converted into linearly polarized lights each having a predetermined polarization direction, are transmitted through a polarizing plate 35rb and then enter the combining prism 36. The green, blue and red image lights 33g, 33b and 33r combined by the combining prism 36 are projected on a projection surface such as a screen through a projection lens 37.

Figure 13:
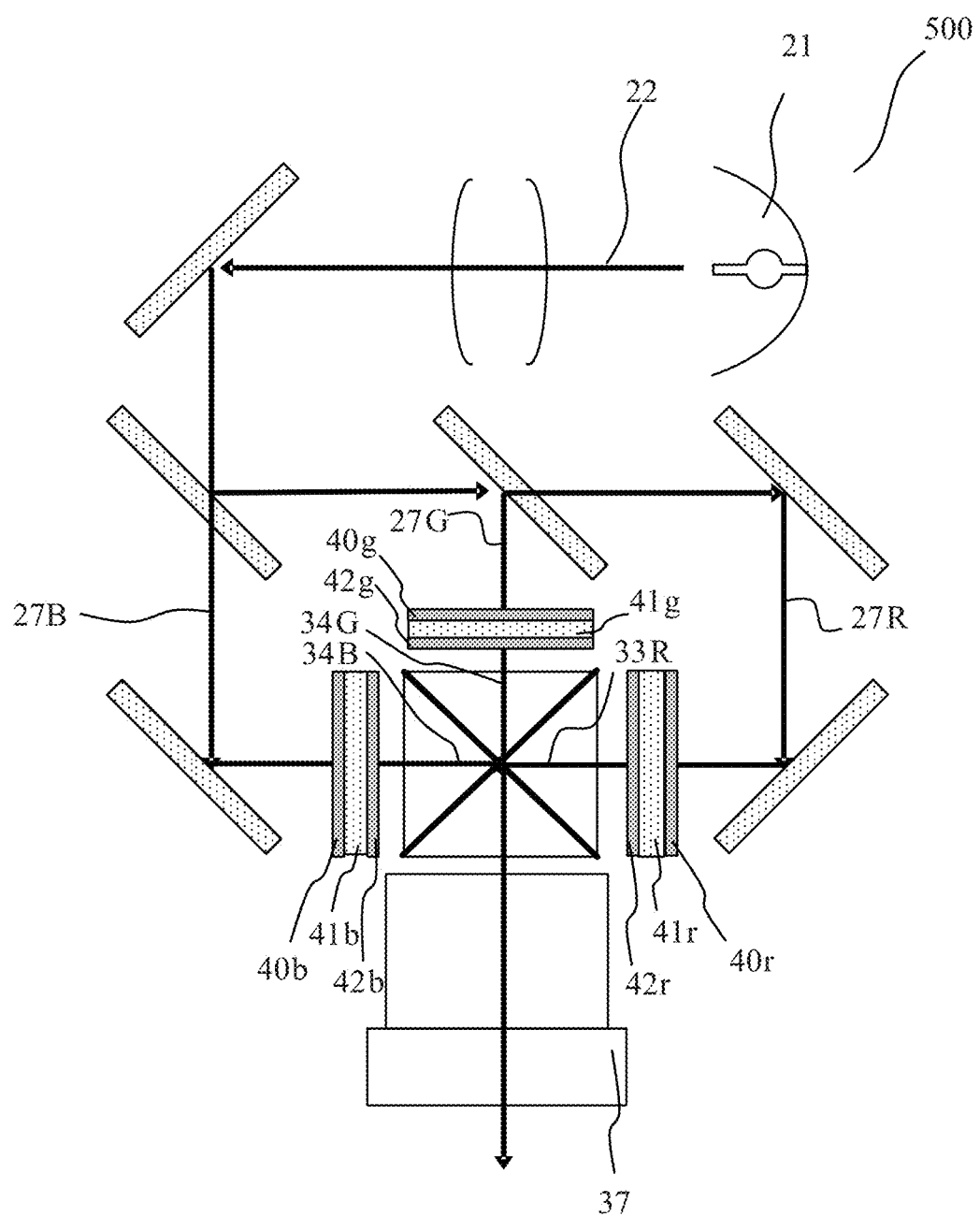
FIG. 13 is a schematic diagram showing a configuration of an image projection apparatus as another embodiment of the present invention.

The image projection apparatus 400 of this embodiment uses the low reflective polarizing plate described in the above embodiments as the polarizing plates 28, 35g and 35rb. It is desirable to use the polarizing plate described in the above embodiments especially as the polarizing plates 35g and 35rb disposed on optical paths of the image lights converted by the image display elements 32g, 32b and 32r. Disposing reflective polarizing plates at such positions is likely to cause ghost and flare due to multiple reflections at their surfaces facing surfaces of the prisms 30a and 36 and a lens surface of the projection lens 37, which adversely affects projected images. Therefore, disposing the low reflective polarizing plates described in any of the above embodiments at such positions enables realizing an image projection apparatus capable of suppressing unnecessary reflections while cutting an unnecessary polarized light and thereby of projecting high quality images with reduced ghosts. Although the image projection apparatus shown in FIG. 12, uses reflective image display elements as the image display elements 32r, 32g and 32b, the polarizing plates described in any of the above embodiments can be used also in an image projection apparatus 500 using transmissive image display elements shown in FIG. 13. Although a detailed description of the image projection apparatus 500 is omitted, when transmissive image display elements 41g, 41b and 41r are used, it is necessary that polarizing plates 40g, 40b and 40r and polarizing plate 42g, 42b and 42r be disposed on both entrance side and exit side of the image display elements 41g, 41b and 41r. Using the polarizing plates described in any of the above embodiments at such positions can provide a similar effect to that of the image projection apparatus shown in FIG. 12.

Furthermore, the polarizing plate described in each of the above embodiments can be widely used in various optical apparatuses other than the image projection apparatus, which utilizes polarized light (for example, pickup apparatuses capable of writing and reading information to and from optical disks).

TABLE 1

| | Embodiment | | | | |
|---|---|---|---|---|---|
| | 1 | 2 | 3 | 4 | 5 |
| Grating Shape | Rectangle | Rectangle | Rectangle | Triangle | Triangle |
| Layer Number | Single | Single | Single | Single | Six |
| h[nm] | 1000 | 300 | 400 | 1000 | 181 × 6 = 1080 |
| d[nm] | — | — | — | — | 150 nm |
| FF | 0.06 | 0.1 | 0.15 | 0.04 | 0.054 |
| $n_m$ | 2.0 | 3.78 | 1.88 | 3.51 | 4.12 |
| $k_m$ | 3.0 | 3.52 | 2.61 | 2.73 | 5.42 |
| $n_{base}$ | 1.48 | 2 | 1.48 | 1.48 | 1.48 |
| $n_b$ | 1.48 | 2.155 | 1.48 | 1.48 | 1.48 |
| $n_{top}$ | 1.48 | 2.3 | 1.48 | 1.48 | 1.48 |

TABLE 2

| | Embodiment | | | | |
|---|---|---|---|---|---|
| | 1 | 2 | 3 | 4 | 5 |
| $T_x$ | 84% | 88% | 76% | 93% | 95% |
| $R_y$ | 1.07% | 2.74% | 4.34% | 0.81% | 0.55% |
| $T_x/T_y$ | 362 | 85 | 125 | 150 | 804 |

TABLE 3

| | Embodiment | Comparative Example | | | | | |
|---|---|---|---|---|---|---|---|
| | 1 | 1 | 2a | 2b | 3a | 3b | 4 |
| h[nm] | 1000 | 200 | 1000 | 1000 | 1000 | 1000 | 750 |
| FF | 0.06 | 0.3 | 0.06 | 0.15 | 0.15 | 0.4 | 0.06 |
| $n_m$ | 2.0 | 2.0 | 0.5 | 0.5 | 2.0 | 2.0 | 2.0 |
| $k_m$ | 3.0 | 3.0 | 3.0 | 3.0 | 0.5 | 0.5 | 0.5 |

TABLE 3-continued

| | Embodiment | Comparative Example | | | | | |
|---|---|---|---|---|---|---|---|
| | 1 | 1 | 2a | 2b | 3a | 3b | 4 |
| $n_{base}$ | 1.48 | 1.48 | 1.48 | 1.48 | 1.48 | 1.48 | 1.48 |
| $n_b$ | 1.48 | 1.48 | 1.48 | 1.48 | 1.48 | 1.48 | 1 |

TABLE 4

| | Embodiment | Comparative Example | | | | | |
|---|---|---|---|---|---|---|---|
| | 1 | 1 | 2a | 2b | 3a | 3b | 4 |
| $T_x$ | 84% | 74% | 92% | 77% | 50% | 9% | 92% |
| $R_y$ | 1.07% | 18.32% | 1.19% | 10.48% | 0.19% | 1.00% | 8.69% |
| $T_x/T_y$ | 362 | 250 | 6 | 554 | 5 | 22 | 904 |

TABLE 5

| | Embodiment | Comparative Example | | | | | |
|---|---|---|---|---|---|---|---|
| | 1 | 1 | 2a | 2b | 3a | 3b | 4 |
| $T_x$ | ○ | Δ | ○ | Δ | Δ | X | ○ |
| $R_y$ | ○ | X | ○ | X | ○ | ○ | X |
| $T_x/T_y$ | ○ | ○ | X | ○ | X | X | ○ |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-000919, filed on Jan. 8, 2013, which is hereby incorporated by reference herein in its entirety.

What is claimed is:

1. An absorptive wire-grid polarizer comprising:
a dielectric substrate; and
a periodic structure formed on a substrate surface of the dielectric substrate and constituted by a metal and one or more dielectric materials whose number is represented by i,
wherein the periodic structure has a one-dimensional grating structure in which, in a sectional plane orthogonal to a normal to the substrate surface, grating portions of a metal grating formed of the metal and grating portions of dielectric gratings formed of the one or more dielectric materials are one-dimensionally arranged with a grating period P smaller than that of an entering light entering the polarizer, and
wherein the following conditions are satisfied:

$n_m \geq 2.0$;

$k_m \geq 3.0$;

$0.01 \leq FF \leq 0.25$;

$n_b \geq 1.40$; and $h \geq 250$ nm, where h represents an entire height of the metal and dielectric gratings, $n_m$ represents a refractive index of a real part of a complex refractive index of the metal for a wavelength of the entering light, $k_m$ represents an extinction coefficient of an imaginary part of the complex refractive index, $n_b$ represents an average refractive index of the dielectric gratings, and FF represents an average filling factor of the metal grating to the grating period P, FF and $n_b$ being expressed by the following expressions:

$$FF = \frac{1}{h}\int_0^h \frac{W(z)}{p} dz$$

$$n_b = \frac{1}{h}\int_0^h \left(\sum_i \frac{n_i^2 \cdot W_i}{W(z)}\right)^{0.5} dz,$$

$$W(z) = \sum_i W_i(z)$$

where W(z) represents a grating width of the grating portion of the metal grating occupying in the grating period p at a grating height z, and $n_i$ and $W_i$ respectively represent a refractive index and a grating width of an i-th dielectric material.

2. An absorptive wire-grid polarizer according to claim 1, wherein the periodic structure has, in a sectional plane parallel to the normal to the substrate surface, a structure in which each grating portion of the metal grating is formed between rectangular grating portions of the dielectric gratings.

3. An absorptive wire-grid polarizer according to claim 1, wherein the periodic structure has, in a sectional plane parallel to the normal to the substrate surface, a structure in which each grating portion of the metal grating is formed on an oblique surface of each triangular grating portion of the dielectric gratings and each triangular grating portion of the dielectric gratings is formed between the grating portions of the metal grating.

4. An absorptive wire-grid polarizer according to claim 1, wherein the periodic structure has, in a direction in which the normal to the substrate surface extends, a structure in which multiple one-dimensional grating structure layers each having the one-dimensional grating structure are laminated.

5. An absorptive wire-grid polarizer according to claim 4, further comprising:
an intermediate layer formed of a dielectric material disposed between the laminated one-dimensional grating structure layers, and
wherein a product of a refractive index and a thickness of the intermediate layer is 20 nm or more and 300 nm or less.

6. An absorptive wire-grid polarizer according to claim 1, wherein the periodic structure is formed on the substrate surface of each of both sides of the substrate.

7. An absorptive wire-grid polarizer according to claim 1, wherein the metal is any of Cr, V, W, Mo, Ta, Fe, Te, Co, Ni, Ge, Ti, or an alloy or a compound including any thereof, but not including Au, Ag and Al.

8. An optical apparatus comprising:
a body; and an absorptive wire-grid polarizer housed in the body,
wherein the absorptive wire-grid polarizer comprises:
a dielectric substrate; and
a periodic structure formed on a substrate surface of the dielectric substrate and constituted by a metal and one or more dielectric materials whose number is represented by i,
wherein the periodic structure has a one-dimensional grating structure in which, in a sectional plane orthogonal to a normal to the substrate surface, grating portions of a metal grating formed of the metal and grating portions of dielectric gratings formed of the one or more dielectric materials are one-dimensionally arranged with a grating period P smaller than that of an entering light entering the polarizer, and
wherein the following conditions are satisfied:

$n_m \geq 2.0$;

$k_m \geq 3.0$;

$0.01 \leq FF \leq 0.25$;

$n_b \geq 1.40$; and $h \geq 250$ nm, where h represents an entire height of the metal and dielectric gratings, $n_m$ represents a refractive index of a real part of a complex refractive index of the metal for a wavelength of the entering light, $k_m$ represents an extinction coefficient of an imaginary part of the complex refractive index, $n_b$ represents an average refractive index of the dielectric gratings, and FF represents an average filling factor of the metal grating to the grating period P, FF and $n_b$ being expressed by the following expressions:

$$FF = \frac{1}{h} \int_0^h \frac{W(z)}{p} dz$$

$$n_b = \frac{1}{h} \int_0^h \left( \sum_1 \frac{ni^2 \cdot Wi}{W(z)} \right)^{0.5} dz,$$

$$W(z) = \sum_i W_i(z)$$

where W(z) represents a grating width of the grating portion of the metal grating occupying in the grating period p at a grating height z, and $n_i$ and Wi respectively represent a refractive index and a grating width of an i-th dielectric material.

* * * * *